United States Patent [19]

Takeuchi

[11] 4,180,063

[45] Dec. 25, 1979

[54] FOOT-OPERATED ROTARY MASSAGING DEVICE

[75] Inventor: Toshio Takeuchi, Kariya, Japan

[73] Assignee: Kabushiki Kaisha Oichi, Kariya, Japan

[21] Appl. No.: 884,243

[22] Filed: Mar. 7, 1978

[30] Foreign Application Priority Data

Dec. 29, 1977 [JP] Japan .................................. 52-160386

[51] Int. Cl.² .............................................. A61H 1/02
[52] U.S. Cl. ..................................... 128/25 B; 128/44
[58] Field of Search ................... 128/56, 25 B, 49, 44, 128/25 R

[56] References Cited

U.S. PATENT DOCUMENTS

| 2,037,495 | 4/1936 | Brogan | 128/25 B |
| 2,081,365 | 5/1937 | Mueller et al. | 128/25 B |
| 2,190,895 | 2/1940 | Turpin | 128/25 B |

*Primary Examiner*—Lawrence W. Trapp
*Attorney, Agent, or Firm*—Blair, Brown & Kreten

[57] ABSTRACT

A foot-operated rotatory massaging device having a crank shaft, a pair of pedal axles connected to the opposite ends of the crank shaft, a pedal rotatably carried by each pedal axle and at least an eccentric massaging member or a stimulating member carried on each pedal axle. The device may either be an independent floor-mounted unit or form a part of a bicycle to also serve as a propelling unit therefor.

10 Claims, 20 Drawing Figures

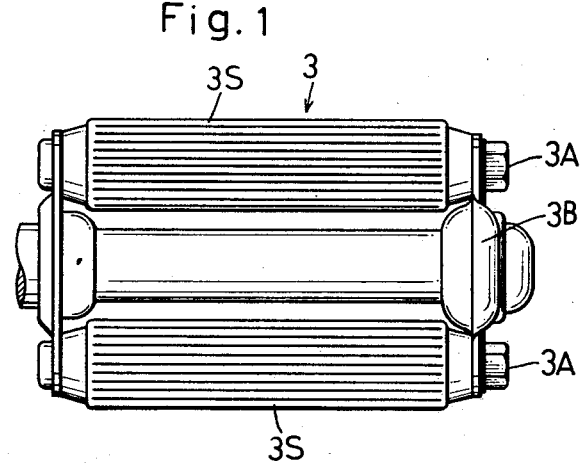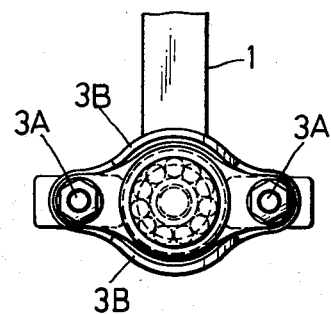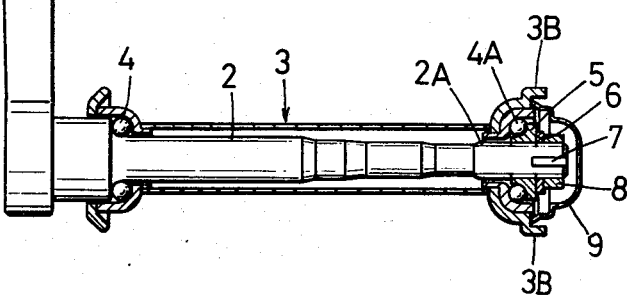

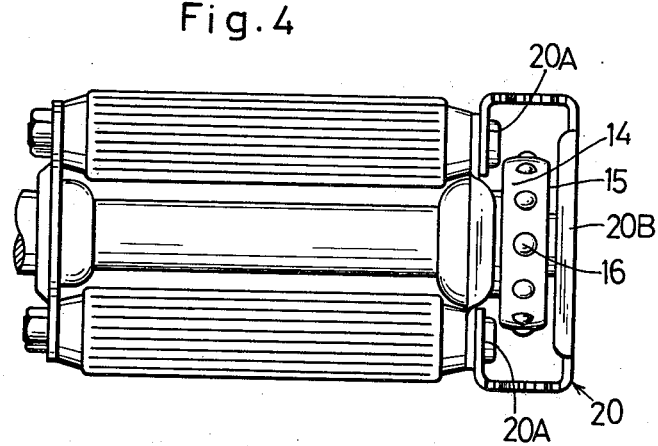
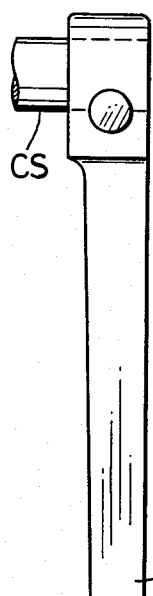
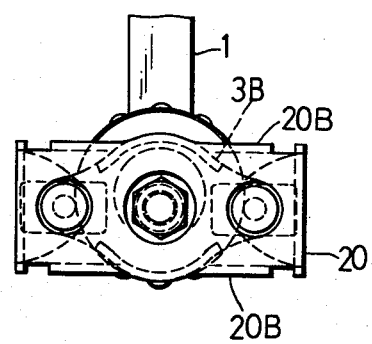
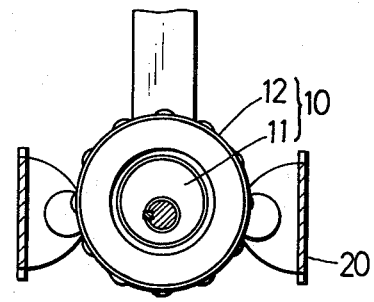
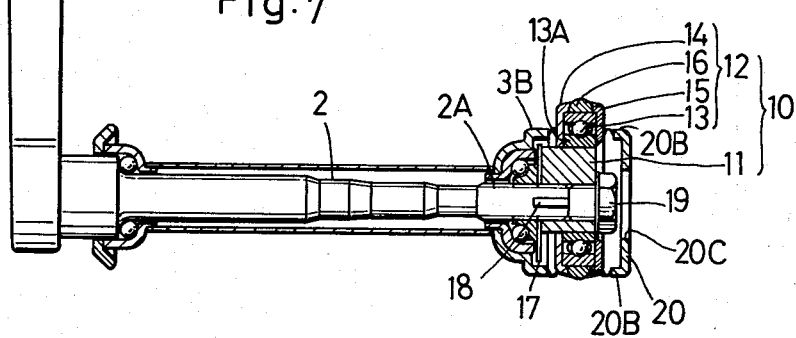

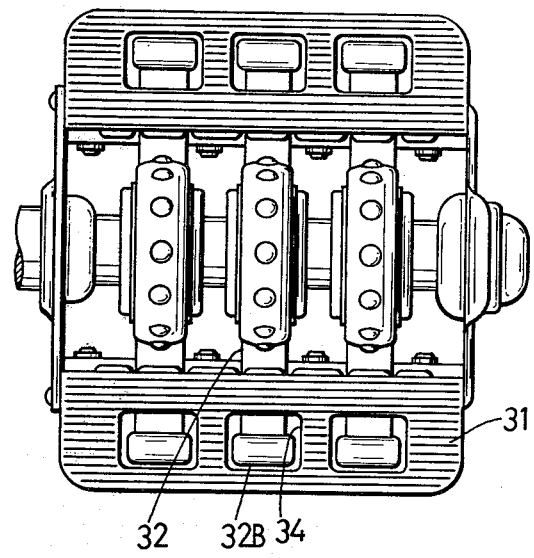
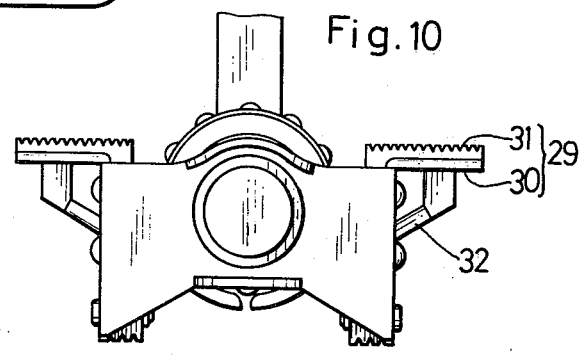
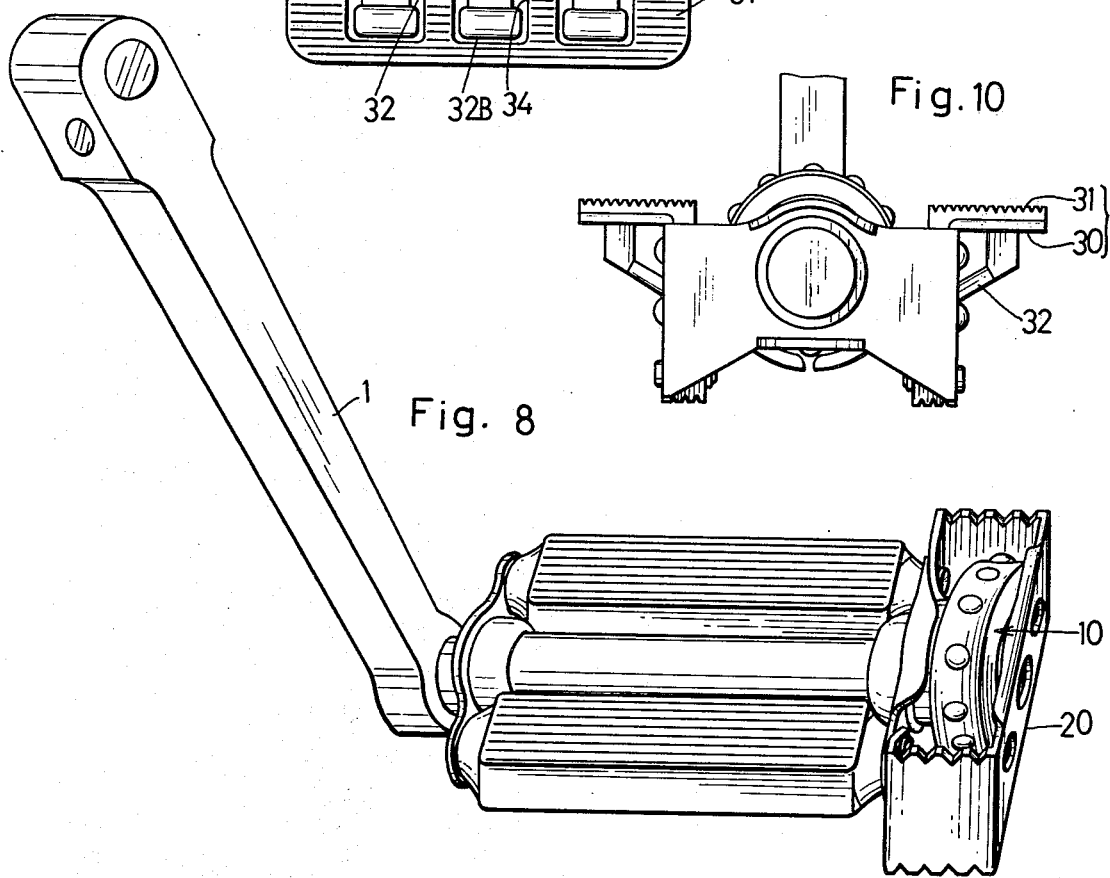
Fig. 9
Fig. 10
Fig. 8

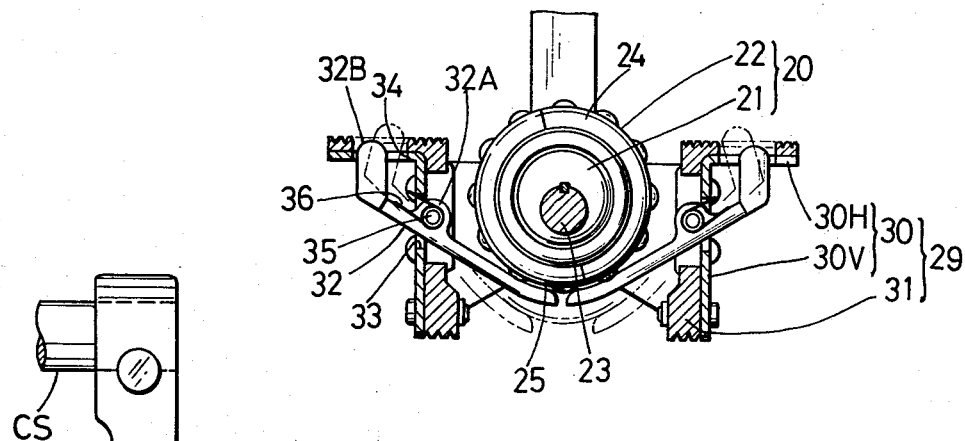
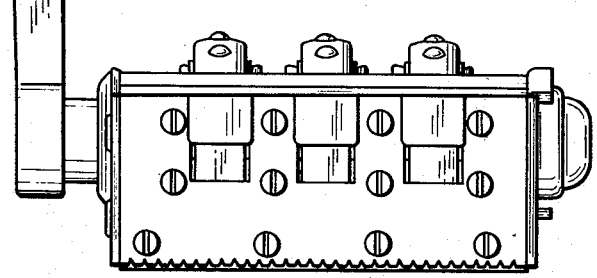
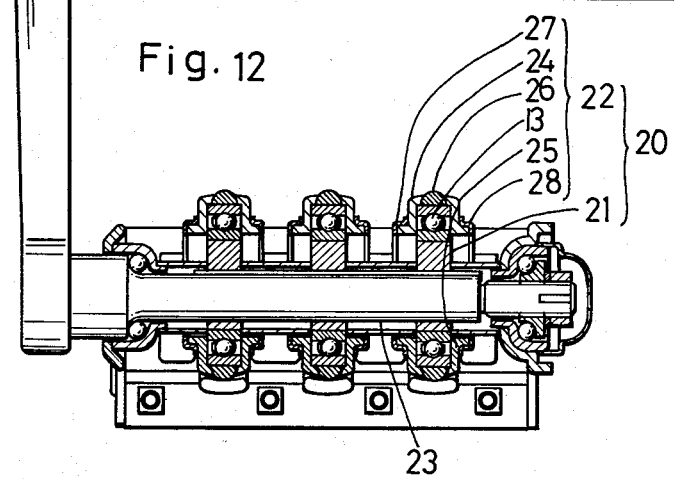

FOOT-OPERATED ROTARY MASSAGING DEVICE

This invention relates to a foot-operated rotatory massaging device.

In a human body circulation of the blood is apt to be interrupted to cause congestion at the soles of his feet because they are farthest from the heart managing the circulation of the blood. For promoting one's health an appropriate stimulus may be given to the soles of this feet to facilitate the circulation of the blood therein.

An object of this invention is to provide an improved foot-operated rotatory massaging device for pressing and rubbing the soles of one's feet intermittently to promote the circulation of blood and lymph therein to quicken the metabolism without making the feet numb by utilizing members of conventional pedals to the fullest and adding only the minimum necessary modifications thereto.

This invention will now be described in further detail by way of example with reference to the accompanying drawings, in which:

FIG. 1 is a top plan view of a conventional pedal of a bicycle;

FIG. 2 is a side elevation of FIG. 1;

FIG. 3 is a front elevation of the pedal of FIG. 1 mounted to a pedal spindle, wherein the section of the mounting portion of the pedal to the pedal spindle is shown;

FIGS. 4 through 8 show a first embodiment of this invention, wherein FIG. 4 is a top plan view of a pedal;

FIG. 5 is a side elevation of FIG. 4;

FIG. 6 is a sectional view of FIG. 5 and showing an eccentric member;

FIG. 7 is a front elevation of the pedal of FIG. 4 mounted to a pedal spindle, wherein the section of the mounting portion of the pedal to the pedal spindle is shown;

FIG. 8 is a perspective view of the entire device of this invention, wherein the pedal assembly is mounted to a crank arm;

FIGS. 9 through 13 show a second embodiment of this invention, wherein FIG. 9 is a top plan view of a pedal;

FIG. 10 is a side elevation of FIG. 9;

FIG. 11 is a sectional view of FIG. 10, wherein an eccentric member is shown;

FIG. 12 is a front elevation of the pedal of FIG. 9 mounted to a pedal spindle, wherein the section of the mounting portion of the pedal to the pedal spindle is shown;

FIG. 13 is a front elevation of FIG. 12;

in FIG. 14 three eccentric members are mounted to the pedal spindle, two of them being mounted obliquely relative to the pedal axis, wherein FIG. 14a is a front elevation of this example and FIG. 14b is an explanatory side elevation of this example;

Figure 14:
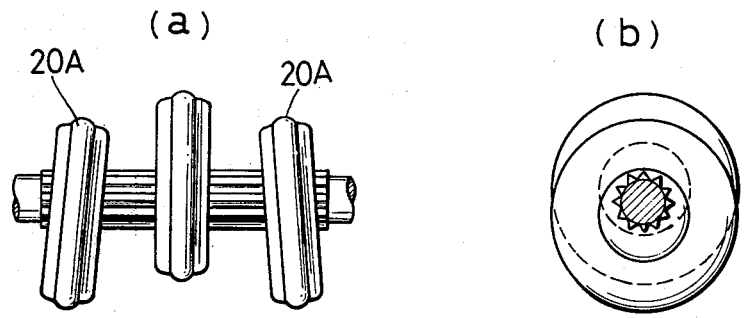
FIGS. 14 and 15 show other examples of the second embodiment.
Figure 15:
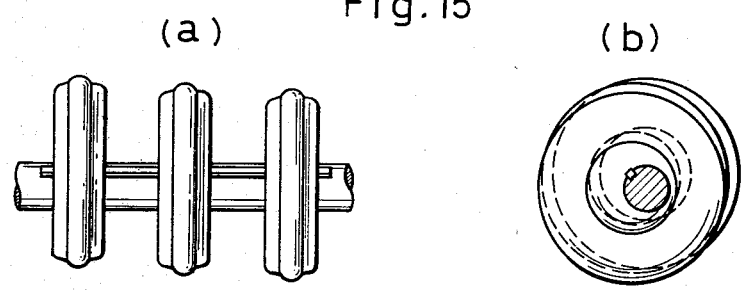
Figure 16:
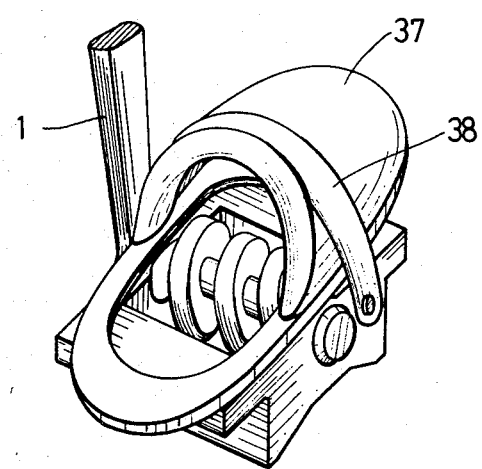
Figure 18:
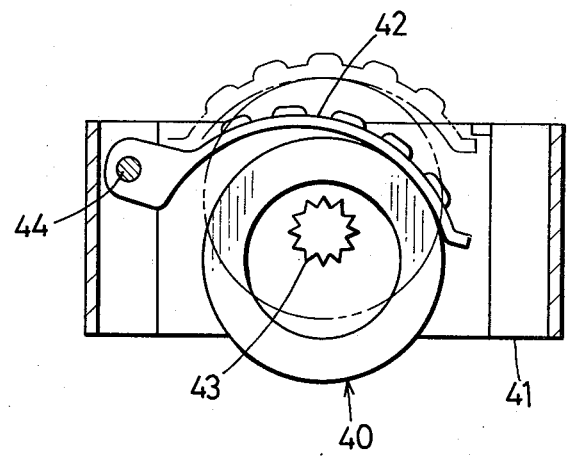
Figure 17:
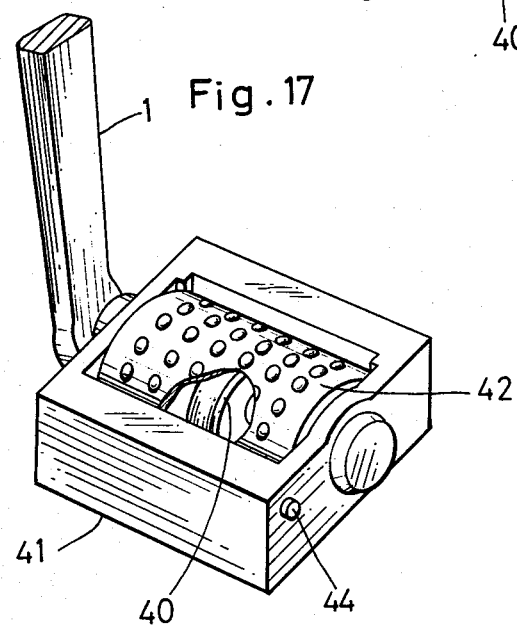

in FIG. 15, each eccentric member is mounted in a different eccentric position relative to the pedal spindle, mutually, but kept in parallel to one another, in which FIG. 15a is a front elevation of this example and FIG. 15b is an explanatory side elevation of this example;

FIG. 16 is an explanatory perspective view of another example of the second embodiment, wherein a warm cover is mounted to the pedal assembly;

FIG. 17 is a partially cutaway perspective view of a third embodiment of this invention;

FIG. 18 is a sectional view taken on line A—A in FIG. 17.

Prior to the explanation of the preferred embodiment of this invention, an ordinary bicycle pedal will be concretely explained referring to FIGS. 1 through 3. A pedal spindle 2 is cantilevered at right angles to one side of the end of a crank arm 1. In the drawings, only one of the crank arms 1 is shown for simplifying the illustration, but it will readily be appreciated that the device of this invention is likewise used on the opposite side of the bicycle not therein shown and described. At the end of the pedal spindle 2, there is formed an external thread 2A for threadedly engaging with a nut 5 covering steel balls and a nut 8 as described later, and a key way 7 parallel to the axis of the pedal spindle 2 is carved in the side surface of the external thread 2A. A pedal 3 is rotatably mounted to the pedal spindle 2 through two groups of steel balls 4 and 4A each annularly arranged along each of the outer peripheral surfaces of the base end portion and the tip end portion of said pedal spindle 2. Side members 3S each parallel to the pedal spindle 2 are mounted to the pedal 3 on the opposite sides of said pedal spindle 2 through bolts 3A. Foot placing members 3B each curved in an arch form to cover the upper and lower end surfaces of the pedal 3 at the tip end portion of the pedal spindle 2 are mounted. The nut 5 covering steel balls threaded adjustably in the mounting position thereof to external thread 2A at the tip end portion of the pedal spindle 2 supports the group of steel balls 4A. A tongue-like rotation stopper projects from a part of the inner peripheral surface of a hole of a circular washer 6 fitting to the external thread 2A and engaging with the key way 7 at the end of the pedal spindle 2. The nut 8 is threadedly engaged with the end of the external thread 2A to prevent the looseness of the nut 5. A semi-hollow dustproof cover 9 in the shape of a hemisphere is attached to the pedal 3 to cover the tip end surface portion of the pedal spindle 2 from the exterior en bloc.

A first embodiment of this invention will be explained referring to FIGS. 4 through 8. In this embodiment, the dustproof cover 9 is removed from the ordinary pedal and an eccentric member 10 is threadedly engaged to the external thread 2A instead of the nut 8 and the washer 6.

The eccentric member 10 comprises an eccentric disc 11 and an annular peripheral portion 12 attached to the external peripheral surface of said disc 11. Said eccentric disc 11 has a hole in an eccentric position relative to the axis of the peripheral surface thereof and an internal thread engageable to the external thread 2A is provided to said hole. The annular peripheral portion 12 comprises a ball bearing 13 inserted in the external peripheral surface of said eccentric disc 11 and regularly spaced substantially hemispherical magnets 16 are radially arranged on the external peripheral surface of said ball bearing. Said magnets are maintained by a cover 14 covering one side surface (the left side surface of FIG. 7) and the external peripheral surface of the ball bearing 13, through which top portions thereof project. A washer 17 is fitted to the inner end surface of the eccentric disc 11.

The eccentric member 10 thus constituted is threadedly engaged with the tip end portion of the pedal spindle 2 through the internal thread formed in the eccentric hole of the eccentric disc 11 and further prevented from loosening by a key 18. A dump bolt 19 engaging with the internal thread of the eccentric disc 11 is threaded thereinto until the top end thereof contacts that of the pedal spindle 2 to clamp the eccentric disc 11 in position. A foot placing frame 20, a horizontal cross section thereof being rectangular opening in one side, is attached to the pedal 3 by mounting flanges 20A provided on either open end of said frame 20 and fastened to the pedal 3 through the mounting bolts 3A. Upper and lower ends of the eccentric member 10 project from the frame 20 and the outer side of the eccentric member 10 is enclosed by the frame 20 as shown in FIG. 4. In the central portion of the outer part of the foot placing frame 20, the upper and lower ends of the frame 20 are substantially horizontally bent toward the eccentric member 10 to face the foot placing surfaces 3B of the pedal 3 to form foot placing surfaces 20B and a hole 20C is provided in the side surface of the central portion of the outer part of the frame 20 to let the dump bolt 19 pass through to tighten the eccentric disc 11.

When one continues to ride the bicycle for a long time, the soles of his feet become congested. In such a case, he moves his feet outwardly from the usual positions to place his soles on the foot placing frames 20 to contact the soles with the upper end portion of the eccentric members 10. When the pedals are stepped down to rotate the crank shafts CS, the pedal spindles 2 fixed to the crank arms 1 rotate once relative to the pedals 3. Therefore, the eccentric disc 11 of the eccentric member 10 fixed to the pedal spindle 2 also rotates once. The pedals are, however, pressed by the soles during the rotation and kept substantially horizontally, so that the annular peripheral portion 12 of the eccentric member 10 is prevented from rotating. For that reason, the annular peripheral portion 12 of the eccentric member 10 is forced up toward the sole along a circular arc to the amount of the eccentricity of the eccentric disc 11. Thus, the soles are forced up once during one rotation of the crank shafts CS and further the positions of the soles receiving the stimulus move along a circular arc. When the pedals are stepped down, the soles receive stimuli corresponding to the number of rotations of the pedals repeatedly, circulation of blood and lymph therein is quickened, the nerves are stimulated appropriately and a roller massaging effect may be obtained.

While in this embodiment, the eccentric member 10 is brought to the highest position when the pedal 3 comes to the lowest position, the eccentric disc 11 may alternatively be adapted to be brought to the highest position in the highest pedal position if the mounting position of the eccentric disc 11 relative to the pedal spindle 2 is appropriately selected. The eccentric disc 11 of the eccentric member 10 may be formed integrally with an internal annular ring 13A of the ball bearing 13. If the eccentricity of the eccentric disc 11 is made larger or the diameter of the annular peripheral portion 12 is made larger, the soles may receive more effective pressing force.

In this embodiment, a technique to fix a ball bearing around the outer peripheral surface of the eccentric disc 11 is disclosed by way of example, but it is not a limitative feature of this invention and any technique is appropriate so long as the outer peripheral portion of the eccentric member 10 may rotate smoothly relative to the eccentric disc 11. In this embodiment, a stimulus by the magnets 16 is obtained with the pressing effects. The eccentric member 10 has a particular good stimulating effect on the feet wearing rubber-soled shoes or only socks without shoes.

Another embodiment of this invention will be explained referring to FIGS. 9 through 16. The trunk portion of a pedal spindle 23 is formed to have an identical outer diameter in any part thereof and key ways are provided thereto. Three sets of eccentric members 20 each having a structure same with that of the first embodiment are keyed to said trunk in parallel lines, while the base end portion and the tip end portion of the pedal spindle 23 are of the same construction with those of conventional pedal spindle 2.

As described above each of the eccentric members 20 has a structure identical with the eccentric member 10 of the first embodiment and has an eccentric disc 21 and an annular peripheral portion 22. Each stimulating member 26 composed of magnets is held by covers 24, 25, each being divided into half circular parts, instead of the covers 14 and 15 of the first embodiment and further covered by annular-shaped caps 27 and 28 on either side. Therefore, the stimulating member 26 may appropriately be changed by sliding the caps 27 and 28 in the lateral opposite directions and removing the covers 24 and 25.

Other materials, for example, rubber, wooden pieces, copper pieces or radium may be used for the stimulating member 26 instead of the magnets and the stimulating member 26 may also be formed in other shapes, such as uneven projections, longitudinal, vertical or oblique ribs instead of the hemisphere-shape illustrated.

Side members 29 are mounted to the pedal spindle 23 on either lateral side thereof and in parallel thereto as illustrated in FIG. 11. Each side member 29 is so formed that the upper portions of the eccentric members 20 always project from the upper surface of said side member while the eccentric members 20 and an oscillating lever 32 do not project from the lower surface of said side member. Each side member 29 comprises a side frame 30 composed of a vertical flange 30V made of a vertical plate and a horizontal flange 30H outwardly bent at a right angle from the upper end of said vertical flange 30V and a stepped down member 31 integrally formed from, for example, rubber and synthetic resin, and adapted to extend along the upper surface of said horizontal flange 30V, and integrally connected with said side frame 30 through a bolt. Non-skid ribs parallel to the pedal spindle are formed on the upper and lower end surfaces of said stepped down member 31. A hole 33 to receive the oscillating lever 32 is provided in the vertical flange 30V of the side member 29 and a hole 34 is also provided in the horizontal flange 30H, through which a projection 32B at the upper end of the oscillating lever 32 is allowed to appear and disappear. Each hole 33 and 34 is provided through both of the side frame 30 and the stepped down member 31 of the side member 29 in combination. Each set of the holes 33 and 34 is positioned in alignment with the eccentric member 20 on either side thereof.

The oscillating lever 32 has a lug 32A on the upper surface of the substantially central point along the length thereof. The lever 32 is inserted into the hole 33 provided in the vertical flange 30V of the side member 29 and pivotally journaled around a pin 35 to said flange 30V through the lug 32A. The upper end of said oscillating lever 32 has a projection 32B projecting upward through said hole 34 provided in the horizontal flange 30H, while the lower end of said oscillating lever 32 extends downward below the annular peripheral portion 22 of the eccentric member 20. If the lever 32 is divided into two parts on either side of the pin 35, the part having the projection 32B is formed to be heavier than the other part. Further, a spring 36 is attached to the pin 35, so that the lower end of the lever 32 is constantly forced up to contact the annular peripheral portion 22 of the eccentric member 20. Consequently, the projection 32B of the lever 32 appears and disappears through the hole 34 of the stepped down member 31 in response to the vertical motion of the eccentric member 20.

When the pedals according to this embodiment are stepped down, roller massaging effects may be obtained by means of the eccentric members 20 as in the first embodiment and further pressing effects may also be obtained by means of the projection 32B of the oscillating lever 32. Pressing effects are obtained by ascent of the projections 32B of the levers 32 at the time of descent of the eccentric members 20, so that the pressing effects by the projections 32B and the roller massaging effects by the eccentric members 20 may be given alternately on a plural parts of the soles, which is very effective for promoting one's health.

In the pedals of this embodiment, when the pedals are stepped down, neither the eccentric members 20 nor the oscillating levers 32 project from the lower surfaces of the side members 29, so that the pedals of this embodiment may be used for an ordinary bicycle if their positions are turned over from those illustrated in the Figures.

Other examples of the second embodiment are explained referring to FIGS. 14a, 14b and 15a, 15b. In FIG. 14, two sets of eccentric members 20A at the opposite ends of the three sets of ones 20 are mounted by means of serration engagement to the pedal spindle obliquely to the pedal axis. In FIG. 15, each eccentric member 20 is mounted in a different eccentric position relative to the pedal spindle, so that the parts of the soles to be stimulated shift gradually and muscle massaging effects may also be obtained.

If a warm cover 37 in the shape of a slipper and having an open bottom is mounted to the pedal and employed as illustrated in FIG. 16, an effect to warm one's instep and finger tips may be obtained, and is suitable for a medical treatment of a patient, especially, of an anemic patient. It is preferable for patients, whose feet are apt to slip off from the pedals, for example, physically handicapped persons, to provide a holding cord 38 on the warm cover 37.

In the aforementioned second embodiment, three sets of eccentric members having an identical outer diameter are illustratively employed, but eccentric members having different outer diameters may be used in combination and the number of the eccentric members may be increased or decreased.

A third embodiment of this invention will be explained referring to FIGS. 17 and 18. An eccentric member 40 having a structure identical with that of the eccentric member 10 of the first embodiment is mounted to the substantially central portion along the length of a pedal spindle 43 by means of a serration engagement system. A pedal frame 41 formed in the rectangular shape is supported rotatably by the pedal spindle 43 in the center thereof. The eccentric member 40 is mounted to appear and disappear downward from the inferior surface of the pedal frame 41 in accordance with the rotation of the pedal.

A stimulating plate 42 of semi-cylindrical shape and having a plurality of projections on the upper surface thereof is vertically pivotally journaled to the pedal frame 41 through a pin 44. The inner surface of the stimulating plate member 42 leans upon the outer peripheral surface of the eccentric member 40 by its own weight and is circumscribing thereto. In response to the vertical movement of the eccentric member 40 brought by the rotation of the pedal, the stimulating plate member 42 moves vertically and pivotally projecting upward from the upper surface of the pedal frame 41. Therefore, when one rotates the pedals of this embodiment shown in FIGS. 17 and 18, his soles are pressed by the projections of the stimulating plate member 42 moving vertically and pivotally.

The stimulating plate member 42 may be replaced by other stimulating members, such as ones provided with projections or grooves in other shapes or ones carrying substances having medical effects, for example magnets, by detaching and fitting the pin 44.

When these pedals are turned over from the condition shown in the Figures, the eccentric members 40 appear and disappear upward from the upper surfaces of the pedal frames 41 and roller massaging effects on the soles may be obtained. Consequently, when one uses the pedals of this embodiment, roller massaging effects and pressing effects may selectively be obtained by preference upon occasion and the effects thereof are very remarkable.

What is claimed is:

1. A foot-operated rotary massaging device comprising a horizontal shaft rotatable about its own axis, a pair of cranks each having one end secured to one end of said shaft, a pedal spindle having one end secured to the other end of said each crank at right angles thereto, a pedal rotatably mounted on each of said pedal spindles, at least one eccentric member having a rotatable annular outer peripheral portion and an axial hole eccentric to the center of said annular outer peripheral portion and mounted to each pedal spindle through said axial hole, wherein said eccentric member massages or stimulates the sole of a foot placed on said each pedal.

2. A foot-operated rotary massaging device as set forth in claim 1, wherein said device is associated with an ordinary bicycle with its bracket axle serving as said horizontal shaft.

3. A foot-operated rotary massaging device as set forth in claim 1, wherein said device further includes a portable and floor-mountable supporting structure on which said horizontal shaft is supported.

4. A foot-operated rotary massaging device as set forth in claim 1, wherein a plurality of said eccentric members having an identical outer diameter are mounted to said pedal spindle parallel to one another.

5. A foot-operated rotary massaging device as set forth in claim 1, wherein a plurality of said eccentric members having an identical outer diameter are mounted to said pedal spindle at an angle to one another.

6. A foot-operated rotary massaging device as set forth in claim 1, wherein a series of said eccentric members having an identical outer diameter are mounted to said pedal spindle in different eccentric positions relative to said spindle.

7. A foot-operated rotary massaging device as set forth in claim 1, wherein a plurality of said eccentric members having different outer diameters are mounted to said pedal spindle.

8. A foot-operated rotary massaging device as set forth in claim 4, wherein said pedal may be used as a conventional pedal associated with an ordinary bicycle.

9. A foot-operated rotary massaging device as set forth in claim 1, wherein a stimulating plate having a plurality of projections and leaning upon said eccentric member to move vertically and pivotally in response to the vertical movement of the eccentric member for stimulating the sole of the foot placed on said each pedal is provided to each pedal.

10. A foot-operated massaging device as set forth in claim 1, wherein a warm cover is provided to said pedal.

* * * * *